Dec. 30, 1958   D. J. McCULLOCH   2,866,539
SPECTACLE CASE
Filed April 10, 1957

INVENTOR.
DONALD J. McCULLOCH
BY
*H. A. Ellestad*
ATTORNEY

United States Patent Office 2,866,539
Patented Dec. 30, 1958

2,866,539

SPECTACLE CASE

Donald J. McCulloch, Rochester, N. Y., assignor to Bausch & Lomb Optical Company, Rochester, N. Y., a corporation of New York Application April 10, 1957, Serial No. 651,842

2 Claims. (Cl. 206—5)

This invention relates to spectacle cases and more particularly it has reference to a spectacle case of the so-called "open end" type.

One of the objects of this invention is to provide an improved spectacle case of the type described which will be relatively simple in structure yet efficient in operation. Another object is to provide such a spectacle case which is so constructed that it lends itself readily to economical methods of manufacture. A further object is to provide a spectacle case of the open end type which will provide substantially complete rigid enclosure for a spectacle so that it will be protected against damage by crushing or the like.

These and other objects and advantages reside in certain novel features of construction, arrangement and combination of parts as will hereinafter be more fully described and pointed out in the appended claims.

Referring to the drawings.

Figure 5:
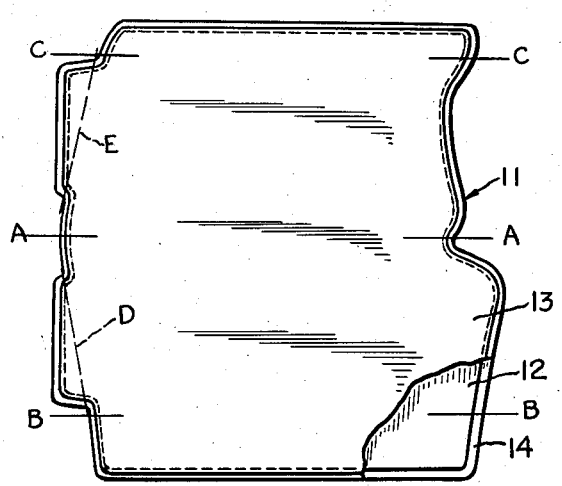
Fig. 5 is a plan view of a laminated member which is used to form the completed case.

A preferred embodiment of my invention is disclosed in the drawings wherein 10 indicates, generally, a spectacle case which is formed up of a laminated member, generally indicated at 11, and comprising a relatively rigid bendable plate 12, made of metal or the like, which is positioned between two pieces of plastic sheet material 13 and 14. The plastic sheet material pieces 13 and 14 have substantially the same contour as the plate 12 but they are slightly larger than the plate 12 so that the overlapping edges of the plastic sheets 13 and 14 are joined, as by heat sealing, around the peripheral edge of the plate 12. The general contour of the laminated member 11 is shown in Fig. 5 of the drawing.

To form the case 10, the laminated member 11 is bent substantially along line A so as to provide the downwardly and inwardly inclined rear wall 15 and the front wall 16 which are connected at the smooth curved bottom 16'. The laminated member 11 is also bent substantially along the line B in order to provide the laterally extending projection which forms the top wall 17. The member 11 is bent substantially along line C in order to provide the integral projection or part 18 which overlies the top wall 17. Bends in the laminated member 11 are also made substantially along the lines D and E so as to provide at the ends of the two side walls the inturned end wall portions 19 and 20 which are brought into contiguous relationship in the formed case so as to substantially close one end thereof. The finished case is substantially triangular in vertical section and will accommodate various styles and types of spectacles.

After the laminated member has been formed into shape, it is held with the parts in fixed relation by securing the overlapping part 18 to the top wall 17. Since the plastic sheets 13 and 14 are both formed of a material which may be heat sealed, the overlying part 18 is secured to the top wall 17 by a heat sealing operation along the edge 21 of the part 18 which unites the plastic sheet material on the outer side of the top wall 17 with the plastic material on the underside of the overlapping part 18.

Figure 4:
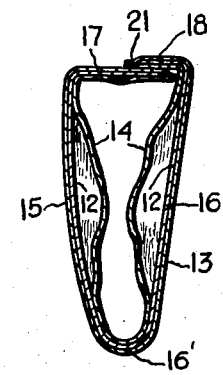
Fig. 4 is a vertical sectional view taken on line 4—4 of Fig. 1.
Figure 3:
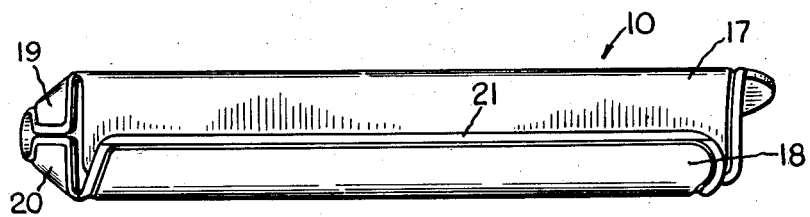
Fig. 3 is a top plan view of the case.
Figure 1:
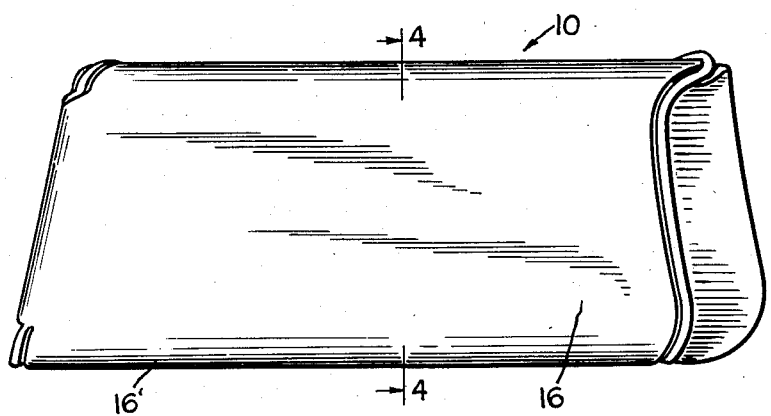
Fig. 1 is a front side elevation of a spectacle case embodying my invention.
Figure 2:
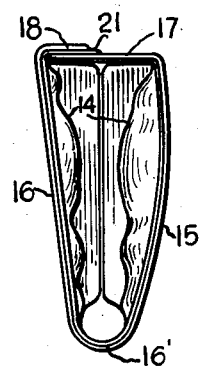
Fig. 2 is an elevation of the right end of the case shown in Fig. 1.

When the laminated member 11 is formed up to provide the case, the sheet material 14 on the inner side of the plate 12 will bulge away from the plate 12 as shown in Fig. 4. This inwardly extending, puckered material will serve to have a gripping or retaining action on a spectacle which is inserted in the case between the opposite puckered walls of material 14.

From the foregoing, it will be apparent that I am able to attain the objects of my invention and provide an improved spectacle case which will be efficient in operation and capable of being manufactured economically. The manufacturing operations are relatively simple since they merely include the steps of blanking the plastic sheet material and the plate member and then heat sealing the parts to provide the laminated member which is then bent to shape and held in position by another heat sealing operation. A spectacle inserted in the open end of the case will thereby be protected against damage by crushing, since the relatively rigid structure will provide very substantial protection to the spectacle. With this construction, the relatively expensive sewing and riveting operations are eliminated so that the case may be manufactured economically. Various decorative effects can be attained by employing suitable decorated or colored plastic sheet materials which are available in a wide variety of designs and colors. Various modifications may, of course, be made without departing from the spirit of my invention as pointed out in the appended claims.

I claim:

1. An open end spectacle case formed of a laminated member comprising a relatively rigid bendable plate positioned between two pieces of plastic sheet material which are sealed together at adjacent edges overlapping the periphery of the plate, said member being formed to provide a case which is substantially triangular in vertical section, said case having front and rear side walls which are downwardly and inwardly inclined to meet at a smooth curved bottom, an integral projection extending laterally from the upper portion of one side wall to the other side wall to thereby provide a top wall, an integral part extending laterally from the upper portion of said other side wall in overlapping relation to said projection, the adjacent plastic sheets of the overlapping part and said projection being heat sealed along the edge of the part to thereby hold the walls of the case in rigid formed relation.

2. An open end spectacle case formed of a laminated member comprising a relatively rigid, bendable plate positioned between two pieces of plastic sheet material which are sealed together at adjacent edges overlapping the periphery of the plate, said member being formed to provide a case which is substantially triangular in vertical section, said case having front and rear side walls which are downwardly and inwardly inclined to meet at a smooth curved bottom, the upper portion of one side wall having an integral projection extending laterally to the other side wall to thereby provide a top wall, the upper portion of said other side wall having a laterally extending part which overlaps the top wall, said part being secured along its edge to the underlying top wall, each of said side walls having at one end an integral projection which extends inwardly into contiguous relationship to the other to thereby provide a closure for one end of the case whereby a spectacle inserted within the case will be substantially enclosed and protected against damage.

References Cited in the file of this patent

UNITED STATES PATENTS

| | | |
|---|---|---|
| 2,176,370 | Wagner | Oct. 17, 1939 |
| 2,758,707 | Baratelli | Aug. 14, 1956 |